United States Patent [19]
Gidaspow et al.

[11] 3,865,924
[45] Feb. 11, 1975

[54] PROCESS FOR REGENERATIVE SORPTION OF $CO_2$

[75] Inventors: Dimitri Gidaspow; Michael Onischak, both of Chicago, Ill.

[73] Assignee: Institute of Gas Technology, Chicago, Ill.

[22] Filed: Mar. 3, 1972

[21] Appl. No.: 231,530

[52] U.S. Cl.............. 423/230, 423/232, 423/233, 252/443, 252/463, 23/284, 136/86
[51] Int. Cl............................................. B01d 53/34
[58] Field of Search ........................ 423/230–233, 423/244, 535; 55/68, 74

[56] References Cited
UNITED STATES PATENTS

| | | | |
|---|---|---|---|
| 1,831,731 | 11/1931 | Al ...................................... | 423/230 |
| 3,505,008 | 4/1970 | Frevel et al .......................... | 423/244 |
| 3,511,595 | 5/1970 | Fuchs ................................... | 423/233 |
| 3,615,196 | 10/1971 | Welty ................................... | 423/535 X |
| 3,619,130 | 11/1971 | Ventriglio et al ..................... | 423/230 |
| 3,660,023 | 5/1972 | Frevel et al .......................... | 423/230 |

Primary Examiner—Earl C. Thomas
Attorney, Agent, or Firm—Molinare, Allegretti, Newitt & Witcoff

[57] ABSTRACT

A process and apparatus for the removal of carbon dioxide from a gaseous stream, wherein the $CO_2$ content ranges from trace amounts up to 50 mole percent, and for subsequent transfer to another gas stream by thermal regeneration. A special composition comprising a finely ground mixture of potassium carbonate and alumina, which has synergistic properties, is used as the absorbent. In a preferred apparatus embodiment, the mixture is incorporated into a rotary regenerative wheel.

12 Claims, 6 Drawing Figures

PATENTED FEB 11 1975

PROCESS FOR REGENERATIVE SORPTION OF $CO_2$

This invention relates to a process and apparatus for the removal of carbon dioxide from a gaseous stream, where the $CO_2$ content ranges from trace amounts to 50 mole percent. More specifically, the invention involves a special $CO_2$ absorbent mixture, and apparatus particularly adapted for the rapid, continuous and repeated regeneration of the mixture material for continuous $CO_2$ removal.

A particularly suitable use of the invention is removal of $CO_2$ from air being breathed in confined quarters, such as submarines, space vehicles and the like where the $CO_2$ must be kept below 1%, and for subsequent transfer to another gas stream by thermal regeneration. The process and apparatus of the invention is also useful for transfer of from 10–50 mole percent $CO_2$ from th cathode input stream of a reformed natural gas molten carbonate fuel cell to the air input anode stream for consumption as a "fuel".

BACKGROUND OF THE INVENTION

The removal of carbon dioxide from various gases is important in many areas. For example, removal of $CO_2$ from industrial gases is important in the purification of input streams for oxygen enrichment processes, transfer from anode to cathode streams in fuel cells, and the like. In a molten carbonate fuel cell from 10–50 mole percent $CO_2$ reacts with oxygen at the cathode to form carbonate ions which migrate through the electrolyte to be reformed at the anode as $CO_2$. While it has been proposed to complete the $CO_2$ mass transfer "circuit" external to the cell from the exhausting anode gases to the in-coming cathode gases, thereby keeping the molten carbonate electrolyte invariant (See: H. A. Liebhafsky and E. J. Cairns, *Fuel Cells and Fuel Batteries*, Ch12, p. 524, Wiley 1968), there does not today exist any practical methods or apparatus for the $CO_2$ transfer from the anode exhaust to the cathode input, exclusive of other gases.

It is also desirable to recover carbon dioxide from industrial gas process streams where the carbon dioxide is produced in large amounts and it is desirable to concentrate and recover the carbon dioxide for use as such, or for compression and solidification as a refrigerant. For example, carbon dioxide is produced in large amounts by fermentation of carbohydrate materials and sugars, in the manufacture of lime and cement, and in the combustion of coal, coke and natural gas.

A second area of increasing interest is involved in closed ecological systems such as are proposed and used in manned space flight vehicles, or in submarines, and the like. It is imperative in such systems that the carbon dioxide exhaled by the occupants of the system be removed from the remainder of the air and concentrated so that it may be either disposed of or further processed to convert it to oxygen.

A primary type of absorbent system involves the use of liquids, such as solutions containing ethanolamine, ammonia, soda, potash, alkaline, carbonates and lyes. However, such systems are expensive, and not simple to regenerate. Indeed, in certain applications, such as in small closed ecological systems such as space craft, it is impractical to carry the large amount of the liquid absorbent for use over prolonged periods of time, and they are difficult to handle in a zero gravity environment. Another disadvantage of the amine solutions are their inability to work practically at carbon dioxide concentrations of less than 1.0 volume percent in the fouled air. The amines and other organics have also been tried in a thin layer on high specific surface solid state type systems such as plates, but have been found subject to bleeding, which is defined as physical loss by carryover or entrainment as vapor or liquid into the exhaust gas stream. In addition, they are subject to oxidation or other types of deterioration losses.

Another approach to the problem has been to use solid absorbent materials such as so-called molecular sieves, calcium oxide, finely divided micro-porous silver oxide dispersed and in admixture with aluminum oxide, and supported cogels of divalent and trivalent metals. However, these special substances are ordinarily quite expensive. In addition, the molecular sieves, for example, have low capacity for carbon dioxide and also co-absorb other gases which either contaminate the carbon dioxide upon its removal or require pre-processing of the gas stream passing through the absorbent. For example, with the molecular sieves, the gas stream must be pre-dried prior to removal of carbon dioxide because of the strong tendency to absorb water.

U.S. Pat. No. 3,511,595 discloses the use of potassium carbonate or other alkaline metal carbonates coated on or impregnated in carrier solids of high specific surface. For example, alumina gel particles, which are granules of alumina gel of 10–14 mesh, are coated with potassium carbonate to an amount of roughly 10 percent. The coated alumina gel granules are then packed into beds through which the air containing the carbon dioxide to be stripped therefrom is passed at relatively low temperatures on the order of 40°F to 100°F. These beds are regenerated by heating the temperature to somewhat over 200°F. The beds are loosely packed, and/or have relatively large passageways therethrough since the pressure drop in the bed is very low. Of course, the use of potassium carbonate alone has long been recognized, particularly in solution, to remove carbon dioxide from gases. This is shown, for example, in early U.S. Pat. No. 496,546. Another example of the relatively early use of an alkali carbonate is U.S. Pat. No. 1,831,731 which employed a mixture of pumice stone, a light, porous stone of volcanic origin which consists of silicates of aluminum, sodium and potassium, along with pulverulent carbonate to remove carbon dioxide from gases.

OBJECTS

It is an object of this invention to provide an improved method and apparatus for the removal of carbon dioxide from gaseous streams.

It is another object of this invention to provide an improved process and apparatus for the continuous removal of carbon dioxide from gaseous streams which provide for continuous regeneration of the $CO_2$ sorbing solids.

It is another object of this invention to provide a solid $CO_2$ sorbing system which sorbs $CO_2$ faster than pure carbonate alone.

It is another object of this invention to provide a system for the sorption of $CO_2$, which system is simple of construction, and can be simply controlled to continuously be generated without loss of $CO_2$ absorbing ability throughout its life.

It is another object to provide an apparatus and system for absorbing $CO_2$ from gaseous steams, such as air, which is compact, simple of operation and can be easily controlled to be demand responsive.

It is another object of this invention to provide method and apparatus for continuous removal of $CO_2$ from a first gaseous stream and transfer to a second gaseous stream, where the $CO_2$ content in the first stream ranges from trace amounts up to above about 50 mole percent.

It is another object of this invention to provide method and apparatus for removal of $CO_2$ from the anode chamber of a molten carbonate type fuel cell, or gaseous exhausting therefrom, and transferring them to the cathode chamber.

It is another object of this invention to provide method and apparatus for removal of $CO_2$ from gases in an ecological system, such as a submarine, spacecraft, or other closed environment, thereby to maintain $CO_2$ content below life critical levels.

It is another object of this invention to provide a method for removing carbon dioxide from a reformed methane stream passed to a molten carbonate fuel cell cathode and transferring the removed carbon dioxide to the fuel cell anode.

These and other objects of the invention will be more evident from the detailed description which follows.

SUMMARY

We have discovered that a mixture of finely divided alkali metal carbonate, e.g. potassium carbonate, and alumina sorbs $CO_2$ faster than pure carbonate alone. A stream of gas containing carbon dioxide and water vapor is passed over a layer of the adsorbent mixture. The sorption of $CO_2$ by the composition of our invention requires water to proceed. If no water is present in the gas stream, it must be added to form the hydrate of potassium carbonate either before $CO_2$ is introduced or simultaneously with the introduction of the $CO_2$. The hydration reaction is as follows:

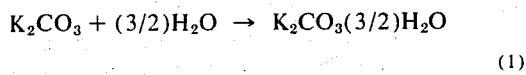

The potassium carbonate hydrate then reacts with the $CO_2$ to form potassium bicarbonate. The sorption reaction is as follows:

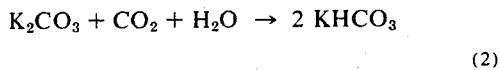

Subsequently, the mixture is heated and the potassium carbonate is regenerated by decomposing the potassium bicarbonate thereby giving up $CO_2$ and $H_2O$ to a second stream of air passing over the mixture layer. A second important discovery is the fact that the bicarbonate formed in the mixture with the finely ground alumina can be regenerated an "infinite" number of times without a crust formation that normally occurs in the case of carbonate used either pure in lump form or coated on support surfaces.

THE FIGURES

The detailed description which follows has reference to the Figures in which similar or like parts are identified with the same numeral.

DETAILED DESCRIPTION

The carbonate used may be any of the alkali metal carbonates, such as potassium carbonate, sodium carbonate, rubidium carbonate, and cesium carbonate. We prefer the use of potassium carbonate. The potassium carbonate as initially used may be either in the dry, anhydrous form, or in a hydrated form. We prefer a hydrated form, but the number of water molecules in hydrated form is not particularly critical in preparation of the mixture. The carbonate is finely divided or ground preferably along with powered alumina. An alumina which may be used is a dried deGussa type C. A typical ratio of the mixture, hereinafter which may be called either a mixture or a salt, is 20–80 percent by weight of carbonate to the alumina. However, this ratio is not critical, and from 5–75 percent carbonate may be used with from 95–25 percent of the alumina by weight to form the mixture. The particle size of the components is not critical and may range from about 20 to 1 U.S. mesh. Generally speaking, larger particle sizes are preferred for higher $CO_2$ concentration. Preferably the alumina has a specific surface area of more than 25 square meters per gram.

The sorption half of the cycle may occur at low temperatures, and we have found that the rate of sorption is essentially independent of temperature from about 20°C to 60°C. In addition, the rate of sorption is independent of the humidity or water content of the salt mixture, as long as sufficient water is present in the salt mixture for the reaction to the potassium carbonate-bicarbonate system and vice versa. Also, the sorbent salt mixture is entirely stable, and capable of thermal regeneration over an extremely long lifetime. In contrast to monoethanolamine scrubbers which utilize a toxic, volatile and combustible liquid, and require high power loads for the proper scrubbing, the composition of this invention is a solid, non-toxic stable mixture which ccan be regenerated using only heat or hot gases continuously without deterioration with time. In contrast to lithium hydroxide scrubbers which are presently used in space vehicles, and are non-regenerative, the system of this invention is easily and continuously regenerated by using waste heat. For example, a rotary exchanger of the type shown in FIGS. 2–4 of only one cubic foot in size should be adequate for life support of a 300 man crew. The system of our invention is particularly useful for purifying moist gases with a $CO_2$ content of 2 percent or less. This makes it particularly adaptable to closed ecological systems.

The sorption half of the cycle is carried out at room temperature or slightly above, for example up to about 60°C or more, and involves the reaction $$CO_2 + H_2O + K_2CO_3 \cdot XH_2O \rightarrow 2KHCO_3 + XH_2O \quad (3)$$

Figure 2:
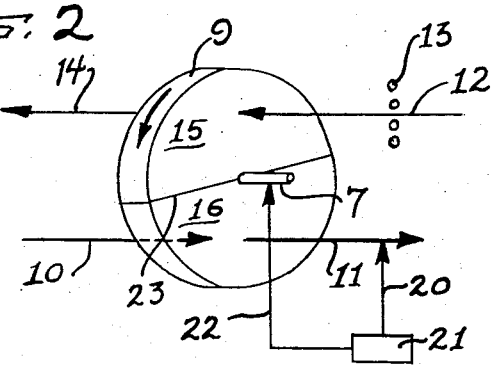
FIG. 2 shows schematically a sorption wheel and the flow path therethrough for both the sorption and regeneration cycles.

Stoichiometry requires one molecule of water per molecule of $CO_2$ for the formation of the bicarbonate. However, potassium carbonate forms a hydrate, $K_2CO_3 \cdot (3/2) H_2O$. Upon measuring the vapor pressure, we found that the hydrate continues to sorb water, which we represent as $K_2CO_3 \cdot XH_2O$. Unlike the pure carbonate which is described in more detail below, we found that the rate of sorption for our salt mixture is not affected by the water content or humidity, as long as sufficient water is present to satisfy the stoichiometry of one molecule of water per molecule of $CO_2$. The critical lower limit for water content in the gaseous mixture is that of stoichiometry. In the rotational system such as shown in FIG. 2, this means that the rotation rate may be varied to satisfy the demands of stoichiometry, or vice versa. In the sorption or cooling stage of the cycle, the salt mixture normally absorbs sufficient water for reaction with the $CO_2$. The rates of water sorption was sufficiently fast such that the diffusion and reaction contribution could not easily be separated. In the preferred temperature range of 20°–60°C, the rate of the sorption of $CO_2$ was not affected by temperature to any significant extent. However, at temperatures greater than 60°C, increased temperatures result in lower sorption rates. Thus, the salt mixture is relatively independent of temperature fluctuations in the gaseous stream, which makes it eminently adaptable for a variety of systems without expensive, fail-safe process controls. In contrast to the sorption of water, the sorption of $CO_2$ is not governed by equilibrium, and therefore does not decrease rapidly with the rise in temperature caused by the evolution of the heat of reaction in the mixture. Since the decomposition pressure of potassium carbonate is very low near room temperatures, it is preferred.

With respect to the regeneration half of the cycle, bicarbonate regeneration begins at about 80°C. In order to assure quantitative and complete regeneration, the regeneration is normally preferred to be run at somewhat higher temperatures up to about 165°C (300°F). However, the fact that the regeneration can be done at as low as 80°C makes it possible to operate an entire regeneration system with a temperature differential of as low as 20°C between sorption and regeneration halves of the cycle. The heat of regeneration may be supplied to the carbonate by an exhausting gaseous stream which may be heated by a heater, gas or electric, or by heat exchange from another source, such as the inlet gas stream.

Figure 1:
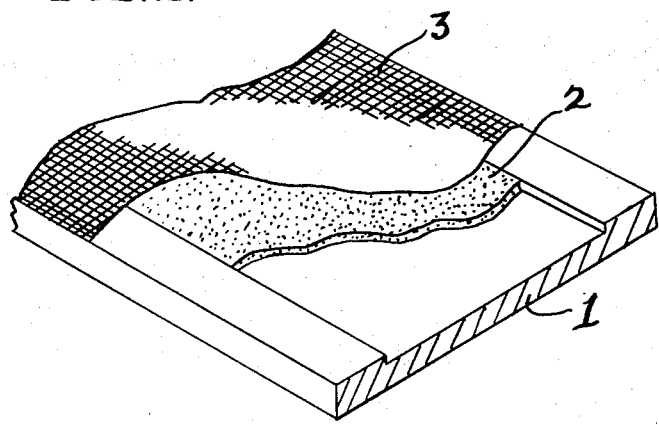
FIG. 1 shows one example of a sorption section illustrating the geometry and sorbent placed thereon.

Referring now to FIG. 1, plate 1 supports a thin layer of the salt mixture 2 which is overlain by a screen 3. A thin stream of gases is passed over the screen surface and the sorption-desorption takes place from the salt. During the desorption or regeneration half of the cycle, the plate may be heated such as by hot air or gases to provide for the necessary heat of regeneration.

The process is particularly suitable for the nearly complete transfer of $CO_2$ from one stream to another for gaseous mixtures containing small percentages of $CO_2$, for example 2 percent or less, or to separate gases containing up to 50 mole percent $CO_2$. We have found that for pure carbonate, the sorption is one-third order concentration dependent. The rate of sorption for the pure carbonate increases only slightly with $CO_2$ concentration (roughly as a cube root of the concentration), and decreases exponentially with time. While we do not wish to be bound by theory, we believe that this concentration dependence observed is due to a mass transfer limitation in the solid phase of the pure carbonate. In contrast, the alumina-carbonate salt mixture of our invention shows a first order sorption rate as to $CO_2$. Thus, we can separate $CO_2$ mixture having greater than 2 percent $CO_2$ concentration by reducing the time between sorption and regeneration. For example, high rotational speeds on the order of less than 1 minute for the rotary regenerator as shown for example in FIGS. 2–4 herein permit the recovery of $CO_2$ from $CO_2$ mixtures containing more than 2 mole percent $CO_2$ up to about 50 percent $CO_2$.

In contrast to the alumina-carbonate mixture of the present invention, pure hydrated potassium carbonate did not show the sorption or lifetime properties required for system utility. For example, where pure hydrated potassium carbonate was packed into a pan, there was a poor utilization of the salt, loss of the salt upon multiple regeneration, and downstream deposition of a portion of the salt. (Upstream and downstream as used herein relate to the direction of the gas flow over the sorption solid.) In addition to the downstream deposition, the upstream salt, that is, salt near the entrance of the sorption section, disappeared by solution.

Still further studies of the pure hydrated potassium carbonate crystals held in place with a fine mesh screen in a shallow pan showed unsatisfactory operation. The most serious aspect was the formation of a crust consisting of very fine compacted powdery material. Underneath the crust, large crystals were found which apparently did not participate in the sorption process. Quite clearly, multiple sorption and regeneration effected a continuing change on the physical character of the salt. As the crystals continue to grow, less and less of the salt was available for the sorption-desorption, and the system became "exhausted." While we do not wish to be bound by theory, the presence of the finely powdered alumina appears to retard the carbonate crystal growth by means of some chemical or physical action which as yet is not fully understood.

The following examples further illustrate the invention in detail and are by way of illustration and not by way of limitation.

Examples 1 & 2

Anhydrous potassium carbonate with a consistency of table salt was ground in a ball mill with fine alumina (deGussa 5–30$\mu$ size) overnight. The grinding was dry, and consisted of 20 percent potassium carbonate and 80 percent alumina by weight. The salt mixture had 85 percent of the particles less than 3$\mu$ in size after grinding and was poured onto a one-sixteenth inch deep pan over which was lain a fine mesh screen (150 mesh). The fine mesh screen was Teflon coated stainless steel and assisted in keeping the mixture from blowing away while an inlet gas stream (air) at 78°F which varied from 0.73 to 1.17 SCFM was passed over the layer. The Teflon coated screen was used because of its antiwetting properties. Two different runs were made, using varying inlet $CO_2$ concentrations and total gas flow rates. In both runs, 40.0 grams of mixture having 8.0g.$K_2CO_3$ therein were used. The steady state average particle size of the mixture was 2$\mu$ with a surface area of 59.5m$^2$/gm. The results are as follows:

Table I

| Time, Min. | Inlet % CO$_2$ Ex. 1 | Inlet % CO$_2$ Ex. 2 | SCFM Ex. 1 | SCFM Ex. 2 | Rate (lbs. CO$_2$/sec-g.K$_2$CO$_3$) ×10$^7$ Ex. 1 | Rate Ex. 2 |
|---|---|---|---|---|---|---|
| 1 | 0.95 | 0.50 | 1.01 | .73 | 4.0 | 3.3 |
| 2 | .95 | .50 | 1.01 | .73 | 3.7 | 3.1 |
| 4 | .95 | .50 | 1.01 | .73 | 2.7 | 2.9 |
| 6 | .95 | .50 | 1.01 | .73 | 2.2 | 2.7 |
| 8 | .95 | .50 | 1.01 | .73 | 1.9 | 2.5 |
| 10 | .95 | .50 | 1.01 | .73 | 1.6 | 2.3 |

After a year of sorption and regeneration, there was little change in the appearance of the powder.

Examples 3 & 4

A similar set-up was used employing pure potassium carbonate in the same initial grain size and in an amount of 58.0 grams, with the following results:

TABLE II

| Time, Min. | Inlet % CO$_2$ Ex. 3 | Inlet % CO$_2$ Ex. 4 | SCFM Ex. 3 & 4 | Rate (lbs. CO$_2$/sec-g.K$_2$CO$_3$) ×10$^7$ Ex. 3 | Rate Ex. 4 |
|---|---|---|---|---|---|
| 1 | .92 | 0.47 | 1.17 | .32 | .28 |
| 2 | .92 | 0.47 | 1.17 | .29 | .26 |
| 4 | .92 | 0.47 | 1.17 | .25 | .24 |
| 6 | .92 | 0.47 | 1.17 | .23 | .22 |
| 8 | .92 | 0.47 | 1.17 | .20 | .20 |
| 10 | .92 | 0.47 | 1.17 | .18 | .18 |

As compared to the pure carbonate shown in Examples 3 and 4, the mixture of Examples 1 and 2 showed a ten-fold increase in the rate of sorption per unit weight of salt. In addition, the improvement per ft.$^2$ of surface area contacted by the flowing gas was very significant. The improvement in utilization efficiency is evident from a comparison of the rate results in Tables 1 and 2. The 8 grams of K$_2$CO$_3$ in the 40 grams of the salt mixture of this invention show a ten-fold increase over the 58 grams of the pure carbonate in Table II.

Examples 5–15

In accordance with the techniques of Examples 1–4 above, a further series of comparative examples were run to show the removal of CO$_2$ in amounts up to about 50 mole percent. Absorption was run at room temperature of 23.8°C.

Examples 5–9 employed finely ground carbonate with alumina in the 80–20 mixture as above at a flow rate of 1.01 SCFM. The mole percent CO$_2$ in the input gas was varied as follows: Ex. 5, 0.5 mole percent CO$_2$; Ex. 6, 1.0 mole percent CO$_2$; Ex. 7, 5.0 mole percent CO$_2$; Ex. 8, 10.0 mole percent CO$_2$; Ex. 9, 20.0 mole percent CO$_2$.

Examples 10–15 employed pure carbonate as above at a flow rate of 1.17 SCFM, with the mole percent of input gases as follows: Ex. 10, 0.12 mole percent CO$_2$; Ex. 11, 0.47 mole percent CO$_2$; Ex. 12, 0.92 mole percent CO$_2$; Ex. 13, 5.0 mole percent CO$_2$; Ex. 14, 15.0 mole percent CO$_2$; Ex. 15, 100.0 mole percent CO$_2$.

Figure 5:
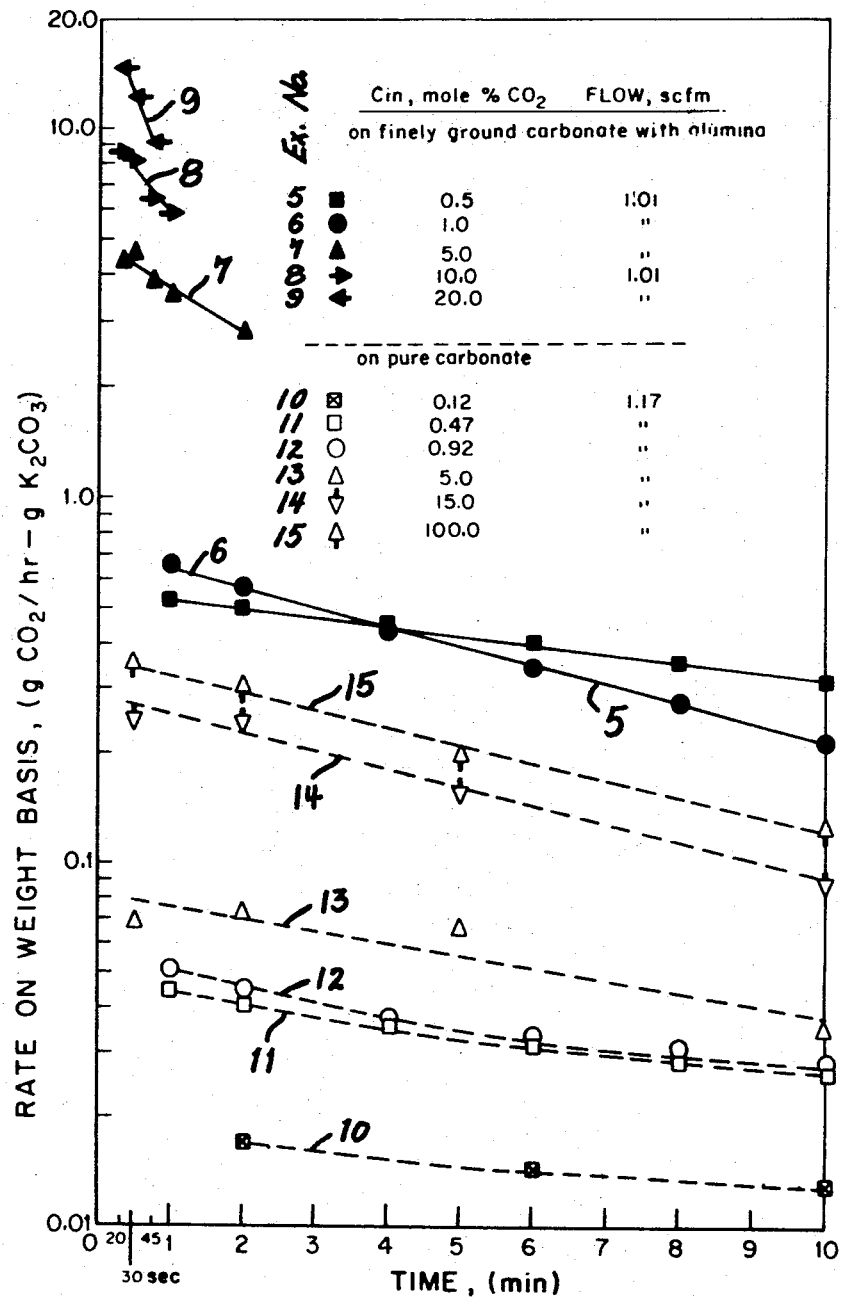
FIG. 5 is a graphical presentation comparing the synergistic combination of alumina and potassium carbonate and pure potassium carbonate.

The rate of takeup of CO$_2$ on a weight basis was determined over a 10 minute period of time, and the results are graphically illustrated on FIG. 5. For low concentrations, the outlet CO$_2$ test data was monitored on a Lira infrared analyzer. As can be seen from FIG. 5, the mixture of this invention retains its increased rate at high CO$_2$ concentrations. There is generally an order of magnitude higher rate for our mixtures. At 5 mole percent CO$_2$ the rate is 16.5 times greater than for the pure carbonate.

Example 16

Figure 6:
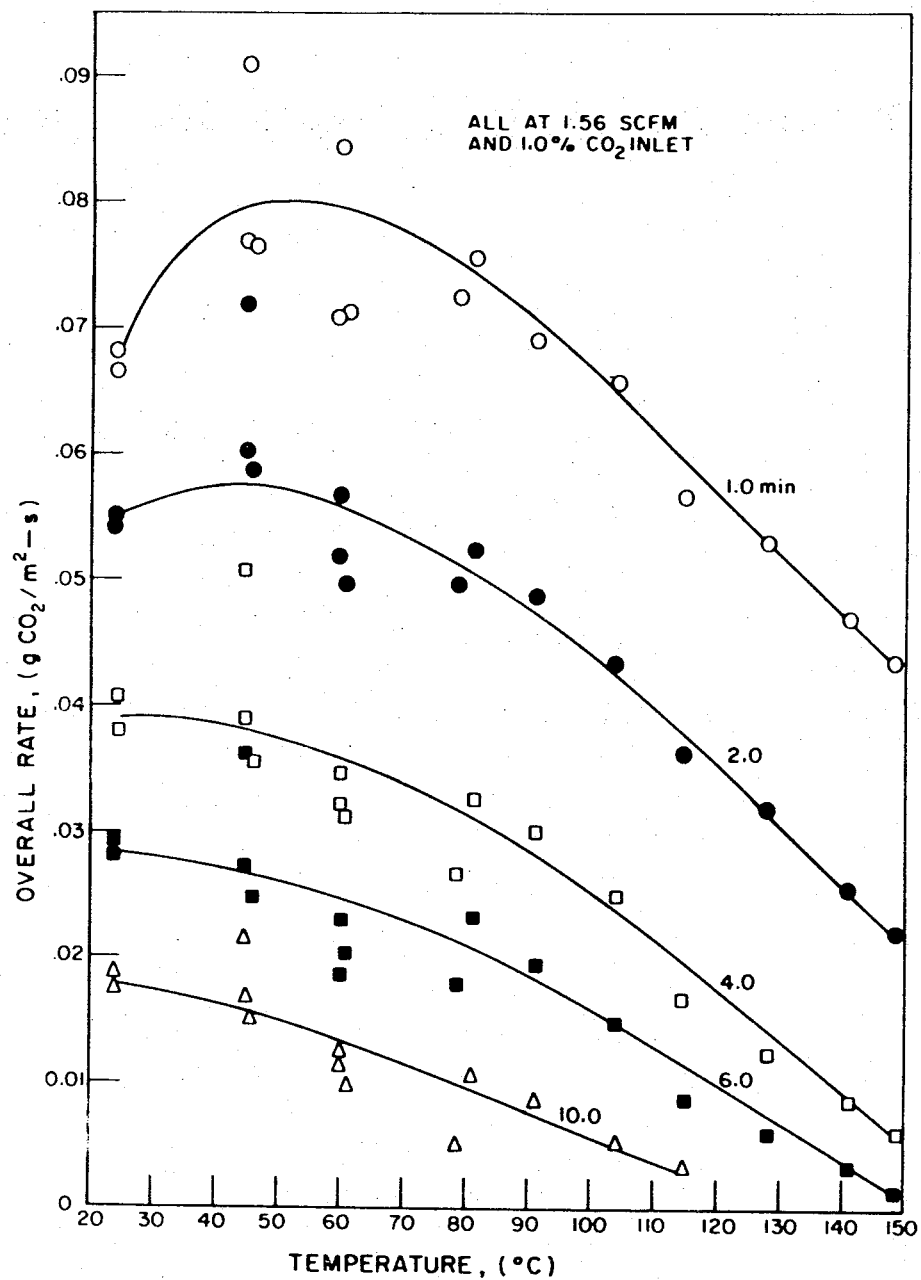
FIG. 6 is a graphical presentation illustrating the sorption rate of the synergistic alumina-potassium carbonate composition at various flow rates and temperatures.

Presented in FIG. 6 is rate data obtained in accordance with the techniques of Examples 1–4 at varying contact times and temperatures with the composition of the present invention. All runs were performed at a 1.56 SCFM flow rate with a 1.0 percent CO$_2$, by volume, inlet concentration. Temperatures were varied from 23°C to 150°C and contact times from 1.0 to 10.0 minutes as indicated in FIG. 6. From the data presented, it will be seen that the finely divided particulate potassium carbonate alumina composition is an effective carbon dioxide sorbent at temperatures up to 150°C, particularly at contact times of 1.0 and 2.0 minutes. This is in complete contrast to pure potassium carbonate, which, from known equilibrium data at 80°C and 1 mole percent carbon dioxide decomposes and accordingly cannot sorb more carbon dioxide at higher temperatures.

Thus this data further shows that the sorbent of the present invention is greatly superior to pure potassium carbonate and is more than a mixture and is a synergistic composition. This is evidenced by the ability of the present sorbent to surpass the equilibrium limitations of the pure carbonate.

Example 17

Tabulated in Table III are equilibrium data on the amount of carbonate converted in the alumina-carbonate sorbent of Example 1. In this table, $W_\infty/W_{max}$ represents the final equilibrium fraction of carbonate converted at a given carbon dioxide concentration.

Table III

| $W_\infty/W_{max}$ | Mole % $CO_2$ |
| --- | --- |
| .38 | 0.5 |
| .36 | 1.0 |
| .51 | 1.5 |
| .72 | 2.0 |
| .90 | 5.0 |
| .92 | 10.0 |
| .97 | 20.0 |

This data illustrates that the sorbent of the present invention is effective over a wide range of carbon dioxide concentrations.

Various types of apparatus may be used in conjunction with our salt absorbent. In one embodiment the salt may be disposed on a series of plates, like those of FIG. 1, arranged parallel and sufficiently close to each other to provide laminar gas flow thereover parallel to the top of the salt-retaining screen. In another embodiment the bottom plate is replaced by a very fine mesh screen which provides two surfaces from which the $CO_2$ may be absorbed. The $CO_2$-laden gas may also be blown through the layer of absorbent, i.e., normal to the surface rather than parallel, as for example in a standard solid absorbent injection system and operating cycles used in conjunction with a baghouse using cellulosic, plastic (e.g., Nylon or Dacron), or fiberglass filter bags.

Figure 3:
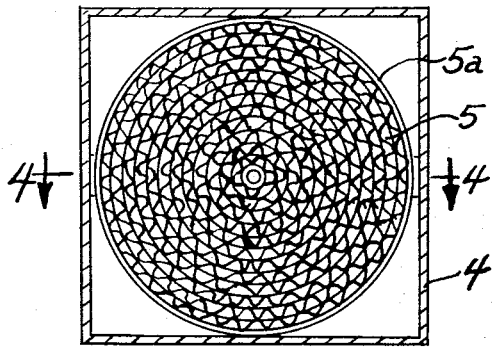
FIG. 3 shows a face view of a sorption wheel of corrugated shape.
Figure 4:
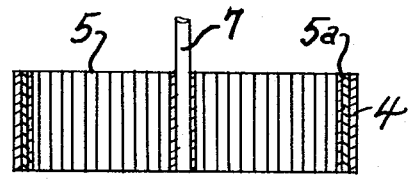
FIG. 4 shows a sectioned view taken along the line 4—4 of the wheel shown in FIG. 3.

A particularly suitable embodiment for supporting the salt mixture of this invention is shown in FIGS. 3 and 4. There, a screen or wire network is folded into corrugations as shown at 5 in FIG. 3. A very coarse screen or wire network is placed between two fine screens which keep the salt from migrating, or loss from the network. The metal screens may be bonded together with epoxy resin or solder or sewn with wire so as to withstand the regeneration temperatures of up to about 165°C. The compound sheet can then be shaped into a device such as the wheel as shown. The wheel form is a rotary regenerator particularly suitable for use in closed ecological systems. The rotary regenerative wheel shown in FIGS. 3 and 4 may be formed as follows. First, a three-ply screen loaded with the salt mixture is lain out flat, and a second three-ply screen is gently crimped in a sinusoidal fashion to have a period of about three-eighths inch and an amplitude of about one-eighth inch. The crimped screen is then laid down over the flat screen and the two screens are rolled together around a central axle 7 as seen in FIG. 4. The spirally wound screen layers are then retained within an outer ring 5A to form the wheel. The wheel may then be disposed within an outer housing 4 of any suitable shape. In cross section, as seen in FIG. 4, the corrugations form axial passages parallel to the shaft 7. If desired, only the flat screen may contain the mixture and a single screen can be crimped to form the corrugations which act as spacers. This assembly may also be reversed, with only the corrugated layer containing the mixture. Rather than corrugations, hexagonal honeycomb shaped channels may be formed. This is particularly suitable since the hexagonal shape exhibits lower pressure drop and less dead spots than the sinusoidal configuration.

One particularly suitable embodiment employs coating the screens with a Teflon dispersion. In the alternative, porous Teflon membranes may be used. Likewise, a Teflon binder may be mixed with the salt mixture of this invention and the composition pressed into the form of sheets which may be formed into the corrugated layers.

Still other embodiments involve the impregnation into fibrous paper-like materials of the salt mixture of this invention by conventional paper making techniques. The fibrous material may be cellulosic, particularly for low temperature operations, or may be more high temperature-resistant materials such as polyesters, special plastics, asbestos fibers, "Fiberfrax" or the like. Fiberglass may also be used. The corrugated wheel may be either performed and then impregnated with the mixture, or the paper may be formed in the presence of a slurry of the salt mixture of this invention so that the salt mixture is integrated into and retained by the fiber structure. The total loading of the fibrous wheel may be from 5–300 percent by weight of the salt mixture of this invention.

A typical wheel may be on the order of 3 inches in thickness and have a one foot diameter. Typical rotation speeds are on the order of from one-fifth to one-tenth rpm through 5–10 rpm, depending on the wheel thickness, the amount of the salt mixture impregnated into the wheel, the radius, $CO_2$ concentration, and the volumetric flow of gases through the wheel. These parameters may be easily selected by the desired requirements of $CO_2$ removal downstream of the wheel.

Turning to FIG. 2, in operation, a wheel 9 is mounted rotatably on a shaft 7 which is moved at a predetermined speed by standard rotational mechanisms, not shown. As seen from FIG. 2, the wheel rotates counterclockwise. The wheel is divided approximately in half into regeneration zone 15 and absorption zone 16. A $CO_2$-laden gas 10, such as air from a closed ecological system or the feed input to a molten carbonate fuel cell comprising a reformed methane stream comes into the absorption half of the cycle as shown by the arrow and passes through the absorption half of the wheel 16. The air exiting from the wheel has removed therefrom the $CO_2$ by the conversion of the carbonate to bicarbonate in the wheel. The $CO_2$ content of the air 11 may be sensed by sensor 20 (shown schematically). This measurement causes speed control 21 to effect the rotation of the wheel 9 through suitable linkage 22 acting on the axle 7. Similarly, the control means 21 could operate a system of dampers to reduce the flow, sound warning buzzers, or the like. The purified gas is then used as desired, for example, recycled for use in the ecological system.

A separate gas stream 12 passes through a system of heaters 13, shown here schematically in cross section as a set of heat exchange tubes, to be heated to regenerative temperature in the range of from 80°–165°C. The heated regeneration gas then passes through the regeneration half of the wheel 15 in the regeneration cycle, and the heat lost from the regeneration gas stream 12 causes the bicarbonate to be regenerated to the carbonate form with the loss of $CO_2$. The gas stream 14 is thus relatively rich in $CO_2$ and the regeneration is complete. The wheel continues to rotate, bringing into zone 16 the freshly regenerated carbonate-alumina salt mixture for re-absorption of $CO_2$ from the gas stream 10. As can be seen from the discussion, the heat absorbed by the gas stream 12 is given up to the wheel which heats up and releases the $CO_2$. The wheel is thus warmed during the regeneration half of the cycle, and is cooled by the incoming stream 10 during the absorption cycle. The wheel gives up some of its heat to the gas stream 11. The heat may be exchanged from the gas stream 11 to the heat exchanger tubes 13, thus effecting conservation of the heat in the system. The heat exchange may be done by a recuperative system such as a shell and tube heat exchanger running between the two streams, or may also be done by a regenerative system, such as a non-hygroscopic, non-$CO_2$-absorbing wheel similar in structure to the wheel 9. For example, this heat exchanging wheel may be constructed of metal, such as aluminum, a wax impregnated asbestos material, or a sectored-wheel packed with glass wool, fiberglass or the like.

It will be appreciated that more than one of the wheels 9 may be used in sequence, or their speed increased where the $CO_2$ concentration is greater than about 2 percent. Thus, a high differential $CO_2$ concentration between streams 11 and 14 may be obtained in a very simple manner.

We have also discovered that initially, for example, for the first two minutes of sorption time and less, the rate of sorption is first order with respect to $CO_2$. However, quite unexpectedly, as the time of sorption increases, the rate changes from first order behavior to one that is nearly independent of concentration. While we do not wish to be bound by theory, it appears that this behavior may be partially explained by reference to an unreacted-core shrinking model as applied to a spherical particle. As the reaction proceeds, the surface area decreases, and the rate falls. With respect to the fractional carbonate reacted, we have found that at higher concentrations the fraction converted is higher for the same sorption time. Generally, as time increases, the fraction of carbonate converted also increases, but at a decreasing rate.

As indicated above, the amount of moisture in the gases must be kept to stoichiometric or above. Where dry inlet gases are used, whatever water is present in the salt mixture will gradually be used up, and the overall rate of sorption will drop due to a deficiency of water in parts of the salt. The salt mixture may be presaturated with a wet gas, or the absorption mixture not presaturated but the inlet gas may be wet itself. At low inlet gas flow rates, the overall sorption rate will remain relatively constant. At higher rates, the overall rate is lower and drops faster but is relatively constant whether or not the sorbent material is presaturated. Thus, although water content and himidity does not affect the rates of sorption markedly, it is best to operate with an excess of water.

The flow independent rates of sorption can be used to size the sorber. The channel thickness between parallel plates or in a corrugated geometry such as shown in FIGS. 3 and 4, are chosen so that the radial diffusional path is minimized as a resistance to mass transfer. This condition occurs when $ka/D$ is less than 0.1 for laminar flow, where $k$ is the rate constant, $a$ is the half-width between parallel plates, and D is the molecular diffusivity of $CO_2$ in the gas. The flow is chosen to be sufficiently fast to neglect back diffusion. This is valid when the Peclet number is greater than about 100. The design equation then is:

$$rdS = Fd\omega$$

where $r$ equals the rate of sorption, grams of $CO_2/m^2$-sec, S equals the surface area of the salt mixture in square meters, F equals the mass flow rate in grams per second, and omega equals the weight fraction of $CO_2$ in the gas. The rate $r$ is a function of sorption time and concentration. For a fresh reagent, that is, equivalent to high rotation speeds and fast flow, the sorber size is a minimum for a given duty, as follows:

$$\Delta S_{min.} = F \Delta\omega/r$$

The volume of the sorber is obtained by multiplying the area $\Delta S$ by the salt thickness, for example one-sixteenth inch.

The corrugation size may also be varied to suit the $CO_2$ removal requirement. For example, a one-sixteenth inch size corrugation (hydraulic diameter) is particularly useful for $CO_2$ removal from ecological air systems. The wheel apertures may also be other than sinusoidal or hexagonal in shape, such as round or square.

As an alternative to the use of a rotary regenerator, a standard, non-rotating checker-box type system holding plates or corrugations of the sorbent salt may be used. In this embodiment, a system of ducts and valves causes air to flow alternately in opposite directions through two separate boxes, or zones in one box; one in the sorbing mode, the other in the regeneration mode. This system has the advantage of less power requirement for the rotational motion of the sorbent plates or wheel, but this may be offset by the more complex timed valving required.

A particular advantageous application of the composition of the present invention and the methods set forth is in combination with a conventional high temperature molten carbonate fuel cell wherein a hydrogen rich gas stream containing water and carbon dioxide is reacted at the cathode with carbonate. Such a gas stream is commonly provided by the steam reforming of various hydrocarbons. Since the fuel cell reaction also involves the reaction of carbon dioxide and oxygen air at the anode to produce the carbonate to be reacted at the cathode, it would be advantageous to remove the carbon dioxide from the hydrogen rich gas stream and pass it to the anode.

Further fuel cells are typically used in close environments where space is at a premium. Accordingly, a sorbent which is to be used in combination with a high temperature molten carbonate fuel cell must be no larger than the cell itself and preferably is smaller than the cell. In addition, when using a hydrogen gas stream from a hydrocarbon steam reforming process, the carbon dioxide must be removed from a water saturated stream. Regeneration must be accomplished with waste heat and both sorption and regeneration must be performed at substantially atmospheric pressure.

All of these features are present in the composition and methods of the present invention. Accordingly, a reformed methane stream containing carbon dioxide, hydrogen and water to be passed to the cathode of a molten carbonate fuel cell is first contacted with the finely divided particulate alkali metal carbonate and alumina sorbent to selectively sorb the carbon dioxide thereon. As in the case of sorbing carbon dioxide from other gas streams, the sorbent must be maintained in a hydrate form. The sorbent is then regenerated preferably with heat and a second gas stream, such as air, to convert the bicarbonate formed during sorption to carbonate and free the carbon dioxide sorbed thereon. This recovered carbon dioxide is then passed to the anode to react with oxygen and produce carbonate which supplies the cathode.

It should be understood that modifications and variations can be made to our invention without departing from the spirit thereof.

We claim:

1. A method of removing $CO_2$ from a gases stream comprising the steps of:
    a. passing a $CO_2$-containing inlet gas stream into contact with a synergistic sorbent composition of finely divided, particulate alkali metal carbonate and alumina, said alumina and carbonate being separate discrete particles and having been ground together to provide such sorbent, to sorb $CO_2$ thereinto and convert said carbonate to bicarbonate,
    b. maintaining said sorbent composition in hydrated form, thereby to remove $CO_2$ from said gases stream; and c. regenerating said sorbent composition by supplying heat to reconvert said bicarbonate to said carbonate form while evolving $CO_2$ therefrom, without forming a crust over said sorbent.

2. A method of $CO_2$ removal as in claim 1 which includes the added steps of:
    a. passing a an exhaust gas stream into contact with said sorbent when said sorbent is substantially in the bicarbonate form,
    b. maintaining said heat until said bicarbonate is regenerated to carbonate and said evolved $CO_2$ is delivered to said exhaust gas stream.

3. A method of $CO_2$ removal as in claim 2 wherein said process is maintained in a continuous cyclic fashion, said passing of inlet gases being in the sorption half of said cycle and said passing of exhaust gases being in the desorption regeneration half of said cycle.

4. A method of $cO_2$ removal as in claim 3 wherein said sorption half of said cycle is maintained at a temperature of up to about 60°C, and said regeneration half of said cycle is maintained at a temperature of up to about 165°C.

5. A method of $CO_2$ removal as in claim 1 wherein the inlet gas stream contains up to about 50 percent, by volume, $CO_2$.

6. A method of $CO_2$ removal as in claim 1 wherein said carbonate comprises from 5–75 percent, by weight of the total composition, and said alumina comprises from 95–25 percent, by weight of said total composition.

7. A method of $CO_2$ removal as in claim 1 wherein said alkali metal corabonate is selected from potassium, sodium, rubidium, and cesium carbonate, and mixtures thereof.

8. A method of $CO_2$ removal as in claim 7 wherein said alkali metal carbonate is potassium carbonate.

9. A method of $CO_2$ removal as in claim 8 wherein said carbonate is admixed, in powdered form, in a size ranging from 20 to 1 U.S. mesh with said alumina, and said alumina has a specific surface area of more than 25 square meters/gram.

10. A method of $CO_2$ removal as in claim 8 wherein said sorbent is supported on a filamentous carrier in an amount ranging from 5–300 percent by weight of said carrier.

11. A method of $CO_2$ removal as in claim 10 wherein said filamentous carrier is selected from wire mesh or fibrous materials capable of withstanding temperatures of over 165° C.

12. A method of $CO_2$ removal as in claim 11 wherein said carrier is a fibrous material selected from asbestos, cellulose, plastic, and mixtures thereof.

* * * * *